Patented Nov. 21, 1950

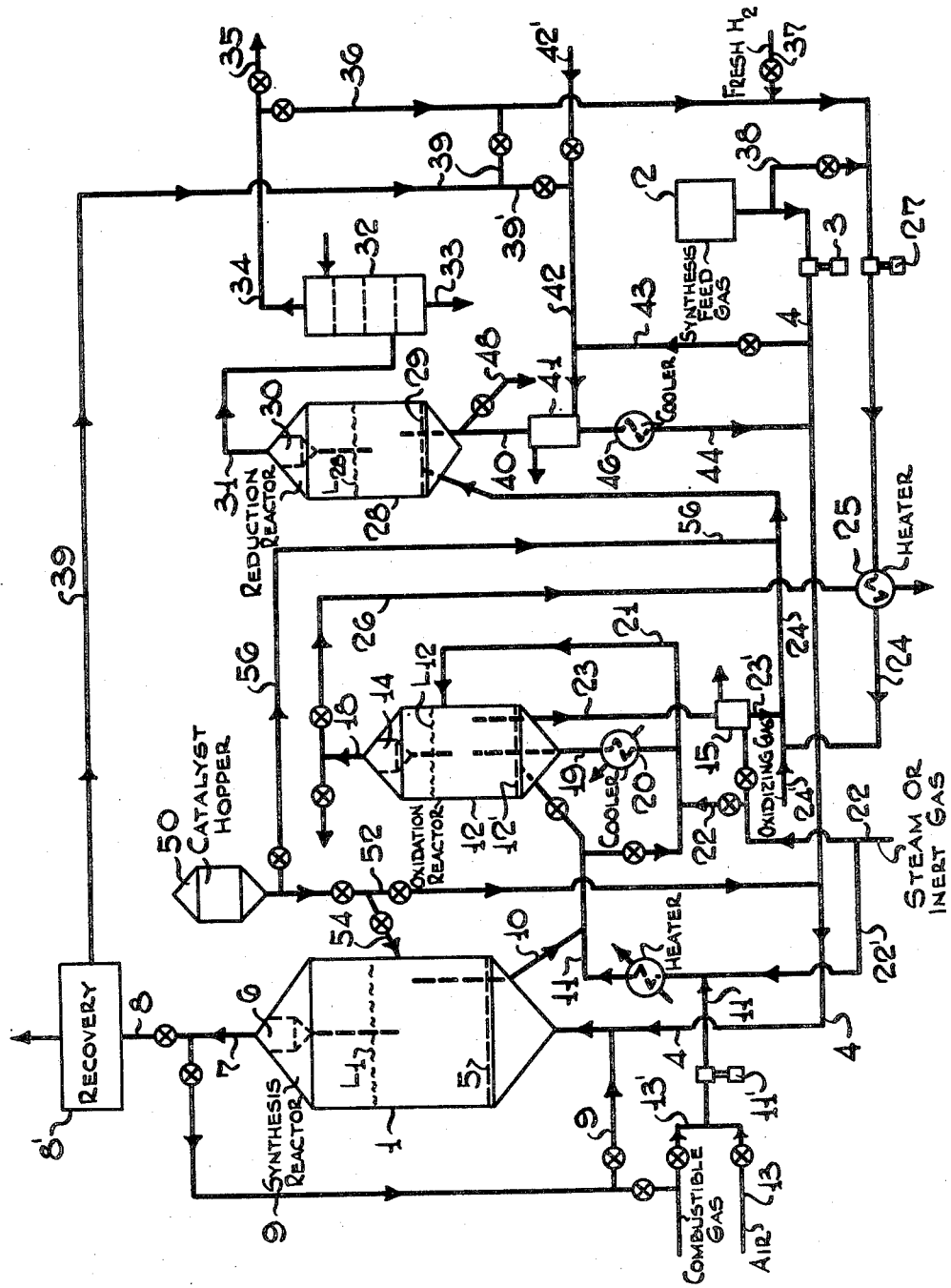

2,530,998

UNITED STATES PATENT OFFICE 2,530,998

SYNTHESIS OF HYDROCARBONS

Walter G. Scharmann, Westfield, N. J., assignor to Standard Oil Development Company, a corporation of Delaware Application December 28, 1945, Serial No. 637,693

3 Claims. (Cl. 260—449.6)

The present invention relates to the manufacture of valuable products by the catalytic conversion of carbon dioxides with hydrogen. The invention is more particularly concerned with an improved method for reconditioning catalysts the utility of which has been decreased in the course of the catalytic conversion of carbon monoxide with hydrogen to form hydrocarbons having more than one carbon atom per molecule and oxygenated products.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to 5 atmospheres) and low temperatures (375° to 425° F.) are applied in the manufacture of a substantially saturated hydrocarbon product while at the higher temperatures (450° to 750° F.) and higher pressures (5 to 25 atmospheres and higher) required for the production of unsaturated and branched-chain products of high antiknock value, iron-base catalysts are more suitable. In both cases the activity of the catalyst declines steadily during the course of the reaction chiefly due to the deposition of non-volatile conversion products, such as carbon, paraffin wax and the like, on the catalyst, as well as due to a change in the degree of oxidation of the active component.

Various methods of preventing these changes in catalyst characteristics or for restoring lost activity to the catalyst have been proposed, including continuous or intermittent extraction of the catalyst in-situ with suitable solvents, intermittent in-situ treatment of the catalyst wih hydrogen and/or steam at the conversion temperature or higher temperatures or continuous hydrogen treatment of powdered catalyst continuously circulated from and to the conversion zone through a suitable regeneration zone, applying the fluid catalyst technique. It has also been proposed to subject the catalyst, particularly cobalt catalysts, prior to the wax removal with the aid of hydrogen at high temperatures, to an oxidizing treatment with oxygen, steam or carbon dioxide at elevated temperatures in order to cause a superficial oxidation of the catalyst metal.

All these methods contemplate the removal of paraffin wax and similar high-molecular hydrocarbon products from the catalyst; they operate efficiently whenever and to the extent to which catalyst deactivation is due to the deposition of such high-molecular hydrocarbon products. However, the deactivation of iron catalysts has been found to differ in this respect considerably from that of cobalt catalysts. The latter is due essentially to the deposition of paraffin wax and may be overcome by a suitable reduction of the paraffin deposit by conventional methods. The deactivation of iron catalysts, on the other hand, appears to be caused to a substantial extent by the deposition of coke-like material formed by the dissociation and cracking of carbon monoxide and unstable hydrocarbons, which take place at the higher temperatures and pressures associated with the use of iron-base catalysts. Deposits of this type cannot be efficiently removed or prevented by the known reactivation methods and, if allowed to accumulate excessively, also adversely affect those characteristics of the catalyst which determine its utility as a fluidizable solid in processes employing the so-called fluid solids technique in which the reactants are contacted with a dense turbulent bed of finely-divided catalyst fluidized by the gaseous reactants and reaction products. It is also probable that changes of the degree of oxidation of the iron component cause changes in iron catalyst activity. My invention relates to an improved reconditioning process which permits the removal of catalyst deposits to a desired degree and the reactivation of catalysts, particularly iron catalysts used in the synthesis of hydrocarbons from carbon monoxide and hydrogen.

It is, therefore, the main object of my invention to recondition catalysts which have been reduced in activity and utility in the catalytic production of hydrocarbons and/or oxygenated products from carbon oxides and hydrogen.

It is a further object of my invention to recondition catalysts of the type specified which cannot be reactivated by conventional methods of reactivation.

It is also an object of my invention to reactivate catalysts of the type specified which have been reduced in activity and/or utility by deposits including substances other than paraffin wax.

A more particular object of my invention is to reactivate catalysts which have been reduced in activity in the catalytic high temperature-high pressure conversion of carbon monoxide with hydrogen.

A still more specific object of my invention is the reconditioning of iron-base catalysts which have been reduced in activity and/or utility in the last-mentioned process.

It is also an important object of my invention to provide a process in which the catalysts of the types mentioned are continuously or intermittently withdrawn from the conversion zone, reconditioned and returned to the conversion zone without interference with a continuous operation of the conversion process.

Other objects of my invention will appear hereinafter.

The characteristics and conditions of the conventional methods for reactivating hydrocarbon synthesis catalysts are determined by the desire to recover substantially unchanged the highly valuable paraffin wax deposited on the deactivated catalyst. I have found that the deposits which deactivate iron-base catalysts contain preponderating proportions of practically worthless coke-like materials and only very little, if any, valuable compounds, such as paraffin wax, whose loss or recovery does not appreciably affect the economic balance of the synthesis process.

I achieve, therefore, considerable improvements in the reconditioning of synthesis catalysts by subjecting synthesis catalysts of reduced utility, particularly iron-base catalysts from the high temperature-high pressure synthesis, to a treatment with an oxidizing gas, such as air and/or oxygen, followed by a reduction with hydrogen or another reducing gas, such as the gas mixture used for the synthesis reaction or synthesis tail gas. In the oxidizing step, the amount of deactivating deposits which form volatile oxidation products, such as coke, tar, resins, paraffin wax, sulfur compounds, etc., is reduced to a desired extent by oxidation or combustion to form mainly carbon oxides and small amounts of water. A temperature range of from 900° to 1500° F. has been found most suitable for this step of my process. The oxidation treatment may even be carried to a point at which oxidation of the metal components of the catalyst takes place. The catalyst subjected to the oxidizing treatment is thereafter subjected to treatment with reducing gases at temperatures ranging from 800° to 1400° F., whereby the activity of the catalyst is substantially restored. I prefer to conduct by two-stage reconditioning process in a continuous manner in cooperation with a continuously operated synthesis process, applying the principles and conditions of the fluid solids technique, as will appear more clearly hereinafter.

The accompanying drawing which forms a part of the instant specification and which is to be read in conjunction therewith is a diagrammatic view of one form of apparatus capable of carrying out the process of my invention. More particularly referring now to the drawing, synthesis reactor 1 contains finely-divided iron-base synthesis catalyst of any suitable composition known in the art of the hydrocarbon synthesis and having a particle size of from 100 to 400 mesh, preferably about 200 mesh. The synthesis gas mixture from any source indicated generally at 2, having a molar ratio of hydrogen to carbon monoxide varying between the approximate limits of 0.5-3:1, is fed by compressor 3 through line 4 to the catalyst zone of reactor 1 and enters the latter through a distribution plate 5 at a velocity controlled within the limits of from ½ to 10 ft. per second so as to maintain the catalyst in a form of a dense, highly turbulent, fluidized mass having a well-defined upper level $L_1$, which is determined by the amount and specific gravity of the catalyst present in the reactor and the speed and viscosity of the synthesis gas. The pressure within reactor 1 is maintained within the approximate limits of 5 to 50 atmospheres, preferably between 10 and 20 atmospheres. Due to the phenomenon of hindered settling of catalyst particles, only a small proportion of the powdered catalyst is carried into the zone above the level $L_1$ which serves as a catalyst disengaging zone. For instance, the fluidized catalyst in the catalyst zone below the level $L_1$ may have a density of 15 to 100 lbs. per cu. ft., while the catalyst density above the level $L_1$ may be as low as 0.05 lb. per cu. ft. The catalyst particles reaching the disengaging zone are separated from the reacted gas in separator 6 which may be a centrifugal or electric type separator, and the gas freed of catalyst leaves reactor 1 through line 7 and is passed through line 8 to a conventional recovery system 8'. A portion of the gas leaving reactor 1 through line 7 may be recycled either at or about the reactor outlet temperature or at a lower temperature through line 9 to line 4 and to the reaction zone in order to assist in the fluidization of the catalyst and/or the temperature control of the reaction zone. As a result of the excellent heat-transfer characteristics of the fluidized catalyst mass contained within reactor 1, the reaction temperature may be easily kept constant within a few degrees F. at the desired temperature level which for the case of iron-base catalysts lies between the approximate limits of 450° and 800° F., preferably between 500° and 650° F. Surplus heat of the exothermic reaction may be withdrawn, and heat required for starting up the process may be supplied by any conventional means (not shown).

To maintain the activity of the catalyst at a high level, fluidized catalyst is withdrawn from reactor 1 at a point above distribution plate 5 through line 10 which may have the form of a standpipe whose contents exert a pseudo-hydrostatic pressure on the base of pipe 10 leading into line 11 wherein the catalyst is mixed with a carrier gas, preferably an oxidizing gas such as air or air enriched with oxygen supplied by pump 11' from line 13; steam or an inert fluidization gas may be added from line 22' to obtain the desired degree of fluidization. The gas in line 11 may be preheated to any desired temperature between the approximate limits of 700°–1200° F. The catalyst suspended in the carrier gas is passed from line 11 into oxidation reactor 12 which is similar in construction to synthesis reactor 1, having a distribution plate 12' and a gas-solids separator 14. The catalyst within oxidation reactor 12 forms under the action of the gas supplied through line 11 and the combustion gases formed, a dense, highly turbulent, fluidized mass similar to that in reactor 1 forming an upper level $L_{12}$. The oxidizing portion of the gases supplied through line 11 is so controlled as to cause the desired combustion of the carbonaceous deposits on the catalyst at temperatures which may vary between about 1000° and 2000° F. Combustion gases leave reactor 12 through separator 14 and line 18 to be used in the system as fluidizing gas or, as shown below, for heat recovery or to be disposed of as desired; they may also be passed to an additional catalyst separation zone (not shown) to recover any catalyst fines carried by the combustion gases.

In most cases the amount of carbonaceous deposit on the catalyst is sufficiently large to generate more heat by combustion of the amount of carbon to be removed than is required to maintain oxidation reactor 12 at the desired temperature. In order to prevent undesired overheating in these cases, I provide for a catalyst circulation from reactor 12 downwardly through line 19 to a cooler 20 and from there through line 21 back to reactor 12. A preferably inert carrier gas such as steam, flue gas, etc., is introduced through line 22 into line 21 to carry a dilute suspension of cooled catalyst upwardly to reactor 12. It will be understood that the temperatures of cooler 20 and the amount of catalyst passed therethrough may be readily controlled so as to maintain any desired constant combustion temperature in reactor 12. If the amount of carbonaceous catalyst deposit is insufficient to generate the heat required in reactor 12, a combustible gas such as natural gas, synthesis feed or tail gas, or the like, may be supplied to reactor 12 through line 13' to generate additional heat of combustion.

After the desired amount of carbonaceous deposit has been removed from the catalyst in oxidation reactor 12, the fluidized catalyst is withdrawn downwardly through line 23 and passed through a stripping zone 15 wherein any oxidizing gas adhering to the catalyst may be removed by an inert stripping gas such as steam, flue gas, etc., supplied from line 22. If desired, the stripping treatment may be so controlled as to leave sufficient oxidizing gas on the catalyst to cause a limited amount of combustion to take place with the $H_2$ in reduction reactor 28, as will appear more clearly hereinafter.

The catalyst leaving stripping zone 15 through line 23' is taken up by a reducing gas, such as hydrogen, synthesis feed or tail gas, which flows through line 24 and which is preheated to a temperature of about 1000° to 1600° F. in heater 25. Hot flue gas from reactor 12 may be passed through line 26 substantially at the temperature of reactor 12 to supply heat to the hydrogen in line 24. The suspension of catalyst and hydrogen formed in line 24 is passed under the action of compressor 27 into the reduction reactor 28 which is of a construction similar to that of reactors 1 and 12. If desired, line 23 in combination with stripping zone 15 and line 23' may be designed to serve as a standpipe whose fluidized contents exert a pseudo-hydrostatic pressure on the base of line 23' which aids in the transport of the suspension of catalyst in reducing gas to the reduction reactor 28. Reactor 28 is provided with a distribution plate 29 and a gas-solids separator 30. The catalyst in reactor 28 forms again a dense, highly turbulent, fluidized mass having a well-defined level $L_{28}$ and is maintained at the desired reduction temperature which may vary within the approximate limits of 800° to 1400° F. Gaseous products, such as steam and unconsumed hydrogen, leave reactor 28 through line 31 which leads into a cooler 32 wherein water and any catalyst fines which were not separated in separator 30 are respectively condensed and precipitated and withdrawn through line 33 for further catalyst recovery, if desired. Surplus hydrogen is removed overhead from cooler 32 through line 34 and either discarded through line 35 or recycled through line 36 to compressor 27 and hydrogen feed line 24. Fresh hydrogen may be added through line 37 to hydrogen recycle line 36. Synthesis feed or tail gas may be added from lines 38 and 39, respectively. While in most cases the sensible heat of the hot catalyst withdrawn from reactor 12 in combination with the hydrogen preheat is sufficient to maintain reactor 28 at the desired reduction temperature, additional heat may be generated by the combustion of small amounts of $H_2$ with the aid of an oxidizing gas such as air and/or oxygen supplied through line 24' or adhering to the catalyst from reactor 12. If air is used for this purpose, the hydrogen recycle must be purged through line 35 to prevent accumulation of inert gases in the system.

Catalyst adjusted to the desired carbon content and degree of oxidation is withdrawn from the bottom of reduction reactor 28 through line 40 and passed through a stripping zone 41 wherein, if desired, adhering gases may be removed by a stripping gas such as steam, natural gas, synthesis feed or tail gas, etc., supplied through line 42 from lines 39', 42' or 43. Reconditioned catalyst leaves stripping zone 41 through line 44 which may, similar to lines 10 and 23, be designed as a standpipe to exert a pseudo-hydrostatic pressure on the base of line 44. The catalyst in line 44 may thus be fed under its own pseudo-hydrostatic pressure into synthesis gas feed line 4 and thus returned to the synthesis reactor 1 as a suspension of catalyst in synthesis gas. Preferably, line 44 is provided with a cooler 46 in order to lower the temperature of the reduced catalyst to be recycled sufficiently below synthesis temperature, say to a temperature between the approximate limits of 100° to 400° F., in order to prevent premature reaction outside synthesis reactor 1.

It should be understood that the reconditioning system, comprising essentially reactors 12 and 28, may be conveniently operated under the same pressure as synthesis reactor 1. However, if desired, either higher or lower pressures may be applied in the reconditioning system, using such means well known in the fluid solids technique as pressurized or depressurized catalyst feed hoppers.

In order to further illustrate my invention, the following example is given which should not be construed as limiting the same in any manner whatsoever.

*Example*

Reactor 1 is operated at a dense phase capacity of about 10 cu. ft. containing about 500 lbs. of iron catalyst having an oxygen content of about 10% and a carbon content of about 20% in a fluidized catalyst phase of about 50 lbs. per cu. ft. density which is contacted by about 10,000 cu. ft. per hour of fresh synthesis gas containing 31.5% CO at a temperature of about 600° F. and a pressure of about 15 atmospheres. At these conditions, about 1.5% of the CO in the fresh gas is decomposed to form carbon deposited on the catalyst at a rate of about 1.5 lbs. per hour, while the oxygen content of the catalyst is increased by about 0.2 lb. per hour.

In order to maintain these operating conditions, about 25 lbs. of catalyst per hour is circulated at about 600° F. from reactor 1 to reactor 12 and about 220–230 cu. ft. of air per hour is supplied to reactor 12. To maintain a combustion temperature of about 1000° F., about 400–450 lbs. of catalyst per hour is recycled through lines 19 and 21 through cooler 20 wherein the recycle catalyst stream is adjusted to a temperature of about 800° F. Catalyst containing about 15% of carbon is withdrawn through line 23 at the rate of about 23–24 lbs. per hour, passed to reactor 28, subjected therein to a mild reducing treatment at about 800° F., in which about 4-5 cu. ft. per hour of H₂ at normal conditions is consumed. The reconditioned catalyst is returned to reactor 1 at a temperature of about 400° F.

It should be understood that the rate at which the catalyst is circulated through the reconditioning system depends mainly on the amount of carbon to be removed per unit of catalyst and time. Thus, at the conditions outlined in the example, if the carbon content is to be reduced from 20% to about 0.5%, about 30-40% of the catalyst charge is circulated per day through the reconditioning system. This figure rises to about 60-70% if the carbon content is to be reduced from 20% to about 10% and may exceed 100% at the conditions of the example. In general, the catalyst circulation rate falls within the approximate limits of 1 and 100% per day of the catalyst charge of reactor 1.

The process of the present invention may be widely varied; for instance, the system described above may be readily adapted to the use of synthesis catalysts other than iron-base catalysts, such as cobalt or other group VIII metal-base catalysts, by appropriate variations of the temperature and pressure in the synthesis reactor and adaptation of the oxidizing and reducing conditions in reactors 12 and 28, respectively, to the specific composition and properties of the catalyst deposits formed in these modifications of the synthesis reaction. Activators, such as alkaline earth and rare earth metal oxides may be added to the catalysts which may be supported of inert carrier materials, such as kieselguhr, silica gel, and the like. The reconditioning of the catalyst may also be conducted intermittently rather than continuously in full adaptation to the rate of deactivation of the catalyst. Spent catalyst may be withdrawn from the system through line 48 and fresh make-up catalyst may be fed from hopper 50 through lines 52 and/or 54 to reactor 1, or at any desired point to the reconditioning system, for example through line 56 into line 24. Pipes 10, 19, 23, 40, 44, 52, 54 and 56 may be aerated in a manner known per se to facilitate the downward flow of solids. These and other changes may be made in the details disclosed in the foregoing specification without departure from the invention or sacrificing the advantages thereof.

The process of the present invention is not to be limited by any theory or mode of operation but only by the following claims.

I claim:

1. In the continuous production of hydrocarbons by conversion of carbon oxides with hydrogen in the presence of a finely divided iron-base catalyst maintained in a conversion zone in the form of a dense, fluidized mass in which used fluidized catalyst is withdrawn from the conversion zone, reactivated in a regeneration zone in the form of a dense, fluidized mass and thereafter returned to the conversion zone, the improvement which comprises continuously heating the withdrawn catalyst by the combustion of an extraneous combustible gas with free oxygen in contact with the catalyst to a temperature sufficiently high to initiate and maintain the combustion of combustible catalyst deposits, subjecting the heated catalyst to an oxidizing treatment with an oxidizing gas in an oxidation zone wherein the catalyst is maintained in the form of a dense fluidized mass at a temperature of about 1000°-1600° F. sufficiently high to initiate and maintain the combustion of combustible catalyst deposits, removing at least a substantial portion of carbonaceous deposits from the catalyst by combustion in the course of said oxidizing treatment, passing catalyst substantially at said temperature from said oxidation zone to a reduction zone, wherein it is maintained in the form of a dense fluidized bed, subjecting the catalyst in said reduction zone to a reducing treatment with a reducing gas at a temperature of about 800°-1400° F. but not higher than said first mentioned temperature, adding sufficient oxidizing gas to said reduction zone to generate by a limited combustion of said reducing gas sufficient heat to maintain said second named temperature in said reduction zone, and returning reduced catalyst to said conversion zone.

2. The process as claimed in claim 1 in which the conversion is carried out at a temperature within the approximate range of 450° to 800° F. and a pressure within the approximate range of 5 to 50 atmospheres, and said deposits comprise coke-like materials.

3. The process of claim 1 in which the reduced catalyst is cooled to a temperature below that of said conversion prior to its return to said conversion zone.

WALTER G. SCHARMANN.

REFERENCES CITED

The following references are of record in the file of this patent:

UNITED STATES PATENTS

| Number | Name | Date |
| --- | --- | --- |
| 2,289,731 | Roelen | July 14, 1942 |
| 2,325,516 | Holt et al. | July 27, 1943 |
| 2,348,418 | Roesch et al. | May 9, 1944 |
| 2,360,787 | Murphree et al. | Oct. 17, 1944 |
| 2,365,094 | Michael et al. | Dec. 12, 1944 |
| 2,366,372 | Voorhees | Jan. 2, 1945 |
| 2,386,491 | McOmie | Oct. 9, 1945 |
| 2,391,334 | Nicholson | Dec. 18, 1945 |
| 2,393,909 | Johnson | Jan. 29, 1946 |
| 2,455,419 | Johnson | Dec. 7, 1948 |

FOREIGN PATENTS

| Number | Country | Date |
| --- | --- | --- |
| 557,904 | Great Britain | Dec. 10, 1943 |